March 7, 1961  H. F. NOLLER  2,973,981

ADJUSTABLE FASTENERS

Filed Aug. 11, 1958

INVENTOR.
HARRY F. NOLLER
BY
AGENT

United States Patent Office 2,973,981
Patented Mar. 7, 1961

2,973,981
ADJUSTABLE FASTENERS

Harry Francis Noller, Orinda, Calif., assignor to Smith-Corona Marchant, Inc., a corporation of New York Filed Aug. 11, 1958, Ser. No. 754,459

3 Claims. (Cl. 287—101)

The invention relates to devices for fastening one part to another and more particularly concerns fastening devices which permit relative adjustment between two fastened parts without requiring that the fastening device be loosened or disassembled.

In the manufacture of machinery it is frequently necessary to pivotally connect a link or lever to a reference member in such a way that the pivot and link can be adjusted relative to the reference member.

Prior adjustable fasteners are known which take the form of eccentrically or slidably adjustable pivots. In either case, the fastener includes a threaded portion which is fastened to the reference member by tightening a nut and lock washer on the threaded portion. The several parts used in this manner are costly, and when assembled, require a great deal of space; furthermore, the structure requires the technician to use a tool in each hand to loosen and tighten the fastening device.

It is an object of the invention to provide improved means for adjustably fastening two parts together.

Another object is to reduce the spacial requirements of an adjustable fastening device.

A further object is to provide an adjustable fastening device in which relatively high forces are required to effect adjustment, even when the mechanism is lubricated.

According to the invention, the fastening device is provided with a smooth shank instead of a threaded stud, and a spring, or Bellville, washer is placed on the shank. The end of the shank is then formed or riveted over the washer to form a head, which compresses the spring washer against the reference member. This structure requires much less space, is relatively inexpensive, and permits the pivot pin to be adjusted to any desired position by the use of a single tool. It has been discovered that the force required to adjust such a pivot pin remains relatively high, even when repeated adjustments are made. It has also been found that the adjusting force remains relatively high even in the presence of lubricants.

In order that the invention may be practiced by others, it will be described in terms of an express embodiment, given by way of example only, and with reference to the accompanying drawing in which.

Figure 4:
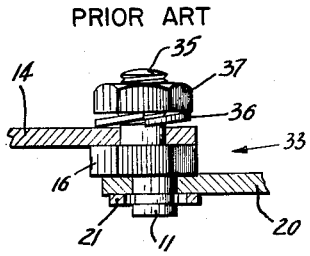
Figure 4 is a sectional view of a presently used structure for fastening a link to a reference member.

The common practice of fastening a link such as link 20 (Fig. 4) to a reference member 14 has been to employ an adjustable eccentric device 33. The latter normally includes a hexagon adjusting nut 16, a pivot pin 11, and a threaded stud 35. The adjustable eccentric device 33 is attached to the reference member 14 by tightening a lock washer 36 and a nut 37 on the threaded stud 35. The assembly shown in Figure 4 clearly requires a pair of tools, one for the nut 37 and one for an adjustment nut 16, to loosen and tighten the assembly when changing the angular position of the eccentric pivot pin 11 relative to reference member 14.

Figure 1:
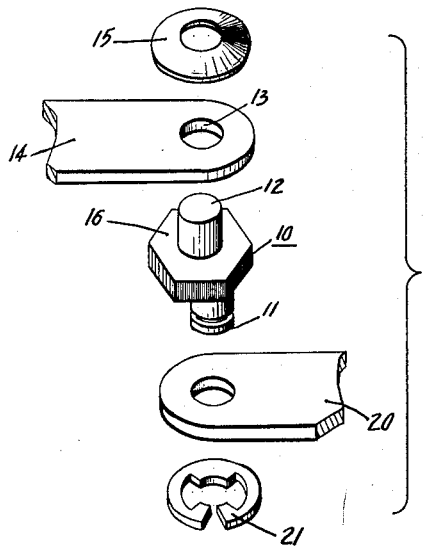
Figures 1 and 2 are exploded isometric views of two adjustable fastening device assemblies.

The adjustable fastening device 10 (Fig. 1) according to the invention comprises a pivot pin 11 which is located eccentrically with respect to an extension or stud 12. The stud 12 has a smooth shank and is placed through a hole 13 formed in the reference member 14. A dish shaped spring washer 15, having a center hole diameter which approximately equals the diameter of the stud 12, is placed over the stud 12 after the stud is passed through the hole 13. The end of the stud then is formed over the washer as shown at 12a in Figure 3. The head compresses the spring washer 15 and, as a result, the washer bears hard against the reference member and forces the upper surface of the adjustment nut 16 into close contact with the adjacent surface of the reference member 14.

A link 20 is pivotally connected to the pivot pin 11 and is held in place by a clip 21. Adjustments of the eccentric pivot pin 11 and link 20 are made by using a single tool to turn the adjustment nut 16 with respect to the reference member 14.

Figure 3:
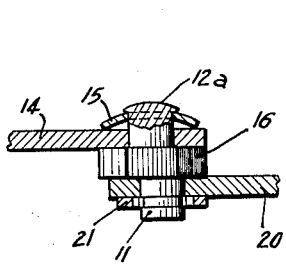
Figure 3 is a sectional view of the assembly shown in Figure 1.

It was found that a fastening device having an extension of .093" diameter and a dished washer having a diameter of .230", when assembled as shown in Figure 3 required a torque of over sixty ounce inches to effect adjustment thereof even after repeated adjustments had been made and the surfaces had been lubricated.

Figure 2:
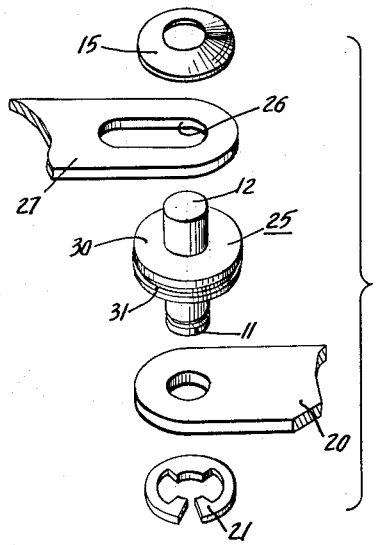

The adjustable fastening device 25 shown in Figure 2 is laterally adjustable and comprises a pivot pin 11 which may be concentric with the stud 12 and a collar 30. The stud 12 is placed in a slot 26 formed in a reference member 27, which slot permits the pivot pin 11 to be laterally adjusted relative to reference member 27. The compression of the dished washer 15 by forming over the end of the stud 12 forces the upper surface of the adjustment collar 30 into close contact with the adjacent surface of the reference member 27.

The link 20 (Fig. 2) is pivotally connected to the pivot pin 11 and is held in place by the clip 21. The pivot pin and link are adjusted with respect to the reference member 27 by the use of a single tool which fits a circumferential groove 31 formed in the adjustment collar 30.

It will be clear to those skilled in the art that the pivot pin 11 of the adjustable fastening device 10 or 25 also has utility as a stop pin. It may be used in this manner to arrest the movement of another member (not shown).

A comparison of the structure according to the invention (Fig. 3) and the prior art structure (Fig. 4) clearly shows that the spacial requirements of the invention are substantially less than those required in the prior art, the fastening device can be adjusted by the use of a single tool, and since the invention requires fewer parts, it is less expensive to manufacture.

The invention claimed is:

1. An adjustable assembly comprising: a hexagonal element having parallel terminal faces; a shank extending from one of said terminal faces; a first link member pivotally mounted on said shank; a dished spring washer on said shank with the larger diameter of said washer in contact with said first link member; a head formed on said shank to compress said dished spring washer; a pin, eccentric with respect to said shank, extending from the other terminal face of said hexagonal element; a second link member pivotally mounted on said pin; and means to limit the axial movement of said second link member on said pin.

2. An adjustable stop assembly comprising two members, one of which is a stop member and the other of which members has an aperture therein, and an adjusting element having a shank portion integral therewith and extending from one side thereof into the aperture of said member and having a pin portion integral therewith and extending from the other side thereof into the path of movement of said stop member, the longitudinal axes of said pin portion and said shank portion being parallel and displaced one from the other for adjustment, by rotation of said element of the stopped position of said two members relative to each other, a dished spring washer mounted on said shank with the outer edge of said washer in engagement with said apertured member, and means on said shank in engagement with the inner edge of said washer to engage and compress the dished washer to force the outer edge of the washer into engagement with said apertured member to yieldably hold the member fixed relative to said adjustment element and said shank.

3. An adjustable assembly comprising two members each having an aperture therein, an adjusting element having a shank portion integral therewith and extending from one side thereof into the aperture in one of said members and having the pin portion integral therewith and extending from the other side of the element into the aperture of the other of said members for free pivotal movement therein, the longitudinal axes of said pin portion and said shank portion being parallel and displaced one from the other for adjustment of said two members relative to each other by rotation of said element, a dished spring washer mounted on said shank with the outer edge of said washer in engagement with said one member, and means on said shank in engagement with the inner edge of said washer to engage and compress the dished washer to force the outer edge of the washer into engagement with said one member to yieldably hold said member fixed relative to said adjustment element and said shank.

References Cited in the file of this patent

UNITED STATES PATENTS

| | | |
|---|---|---|
| 1,044,055 | Johnson et al. | Nov. 12, 1912 |
| 1,125,206 | Strandlund | Jan. 19, 1915 |
| 2,371,835 | McNamara | Mar. 20, 1945 |
| 2,509,285 | Bendicsen | May 30, 1950 |
| 2,676,821 | Reichelderfer | Apr. 27, 1954 |

FOREIGN PATENTS

| | | |
|---|---|---|
| 610,402 | Great Britain | Oct. 14, 1948 |